United States Patent
Winstanley et al.

(10) Patent No.: US 11,511,525 B2
(45) Date of Patent: Nov. 29, 2022

(54) LAMINATED GLAZING

(71) Applicant: Pilkington Group Limited, Lancashire (GB)

(72) Inventors: Neil Winstanley, St Helens (GB); Marco Ronci, Marin Chieti (IT); Neil John Durbin, St Helens (GB); Gustavo Benedetto, Montenero di Bisaccia (IT); Massimo Michetti, San Salvo (IT)

(73) Assignee: PILKINGTON GROUP LIMITED, Lancashire (GB)

( * ) Notice: Subject to any disclaimer, the term of this patent is extended or adjusted under 35 U.S.C. 154(b) by 0 days.

(21) Appl. No.: 17/041,546

(22) PCT Filed: Mar. 21, 2019

(86) PCT No.: PCT/GB2019/050792
§ 371 (c)(1),
(2) Date: Sep. 25, 2020

(87) PCT Pub. No.: WO2019/186115
PCT Pub. Date: Oct. 3, 2019

(65) Prior Publication Data
US 2021/0114354 A1    Apr. 22, 2021

(30) Foreign Application Priority Data
Mar. 27, 2018 (EP) .................................. 18425023

(51) Int. Cl.
*B32B 17/10* (2006.01)

(52) U.S. Cl.
CPC .. *B32B 17/10779* (2013.01); *B32B 17/10045* (2013.01); *B32B 17/10091* (2013.01);
(Continued)

(58) Field of Classification Search
CPC ............................................... B32B 17/10293
See application file for complete search history.

(56) References Cited

U.S. PATENT DOCUMENTS

| 4,985,099 A | 1/1991 | Wasterlain et al. |
|---|---|---|
| 5,013,134 A | 5/1991 | Smith |

(Continued)

FOREIGN PATENT DOCUMENTS

| CN | 105682921 A | 6/2016 |
|---|---|---|
| DE | 102012210906 A1 | 1/2014 |

(Continued)

OTHER PUBLICATIONS

Green, Ceramics and Glasses, Tempering of: Residual Stresses; Encyclopedia of Materials: Science and Technology (Year: 2001).*
(Continued)

*Primary Examiner* — David Sample
(74) *Attorney, Agent, or Firm* — Buchanan Ingersoll & Rooney PC

(57) ABSTRACT

A laminated glazing comprising first and second sheets of glass joined together by an interlayer structure comprising at least first and second layers of adhesive interlayer material with a support sheet therebetween is disclosed. The laminated glazing is arranged such that the first layer of adhesive interlayer material is between the first sheet of glass and the support sheet, the second layer of adhesive interlayer material is between the second sheet of glass and the support sheet support material and at least a portion of the second major surface of the first sheet of glazing material faces the first major surface of the second sheet of glazing material. In the event of breakage of the first sheet of glass, the second layer of adhesive interlayer material remains attached to the support sheet thereby keeping the second glass sheet from becoming detached from the laminated glazing.

20 Claims, 4 Drawing Sheets

(52) U.S. Cl.
CPC .. *B32B 17/10137* (2013.01); *B32B 17/10174* (2013.01); *B32B 17/10633* (2013.01); *B32B 2250/05* (2013.01); *B32B 2255/20* (2013.01); *B32B 2307/416* (2013.01); *B32B 2315/08* (2013.01); *B32B 2367/00* (2013.01); *B32B 2605/006* (2013.01)

(56) References Cited

U.S. PATENT DOCUMENTS

| | | | |
|---|---|---|---|
| 6,432,522 | B1 | 8/2002 | Friedman et al. |
| 2008/0032104 | A1* | 2/2008 | Mannheim Astete ...................... F41H 5/0407 428/433 |
| 2008/0318011 | A1* | 12/2008 | Chaussade .......... B32B 17/1077 428/210 |
| 2009/0242030 | A1 | 10/2009 | Kirschner et al. |
| 2010/0132540 | A1* | 6/2010 | Mandelartz ....... B32B 17/10816 89/905 |
| 2010/0316852 | A1* | 12/2010 | Condo ................... G02B 5/282 428/201 |
| 2013/0295357 | A1 | 11/2013 | Cleary et al. |
| 2015/0000511 | A1* | 1/2015 | Engl ................. B32B 17/10045 89/36.08 |
| 2015/0064374 | A1 | 3/2015 | Jain et al. |
| 2015/0158275 | A1* | 6/2015 | D'Errico .............. C08K 5/3477 428/215 |
| 2015/0224855 | A1 | 8/2015 | Legrand |
| 2016/0250982 | A1 | 9/2016 | Fisher et al. |
| 2016/0354996 | A1* | 12/2016 | Alder ................ B32B 17/10174 |
| 2017/0021597 | A1 | 1/2017 | Michetti et al. |

FOREIGN PATENT DOCUMENTS

| | | |
|---|---|---|
| EP | 0581610 A1 | 2/1994 |
| WO | 2009042877 A2 | 4/2009 |

OTHER PUBLICATIONS

U.S. Appl. No. 17/041,479, filed Sep. 25, 2020, Massimo Michetti.
International Search Report (PCT/ISA/210) and Written Opinion (PCT/ISA/237) dated Jun. 26, 2019, by the European Patent Office as the International Searching Authority for International Application No. PCT/GB2019/050792.
Search Report issued by the British Patent Office dated Oct. 25, 2018 in British Patent Application No. 1809744.4.
Notification of First Office Action issued in Chinese Patent Application No. 201980031073.8, dated Aug. 2, 2022. with English Translation (17 pages).

* cited by examiner

LAMINATED GLAZING

The present invention relates to a laminated glazing, in particular to a light weight laminated glazing for use in a vehicle.

Laminated glazings comprising two sheets of glass joined together by an adhesive layer are known.

EP0581610A1 describes a fire-protection and safety glass panel. A polyethylene terephthalate (PET) film is arranged between a first glass plate and a second glass plate. The first and the second glass plates and the PET film are adhered through transparent acrylic adhesive agent layers.

WO2009/042877A2 describes a lightweight transparent armour laminate comprising layers of borosilicate glass, layers of transparent glass-ceramics and a polymer spall layer of polycarbonate and/or polymethyl methacrylate. The layers are bound by polyurethane and/or polyvinyl butyral interlayer films.

DE102012210906B4 describes a safety glazing having transparent inorganic discs having sides which are separated by a plastic sheet so that the ratio of thickness of the primary transparent inorganic disc to the ratio of the secondary inorganic disc is a pre-set value.

It is well known that laminated glazings are used as windows in automotive vehicles. Usually the window is the vehicle windscreen, but may be a vehicle side window, rear window or sunroof. In the art a vehicle side window may be referred to as a vehicle side light. Typically, the vehicle has at least one, usually two, movable side windows, one on either side of the vehicle i.e. the passenger side and the driver side. In addition to movable side windows, there may be one or more fixed side windows, for example front or rear quarter lights.

In the driver's door there is usually a side window that is movable in a vertical direction by actuation of a suitable winder mechanism. The winder mechanism may be manually or electrically operated and has at least one element in mechanical communication with the side window to move the side window within the vehicle aperture defining the driver's side window.

It is known that a vehicle side window may comprise a sheet of thermally toughened glass. When such a thermally toughened sheet of glass is broken, the integrity of the vehicle side window is lost as the sheet of glass is broken into many small fragments.

In order to reduce the weight of a vehicle side window it is known to use thin sheets of glass that are laminated together by means of an adhesive interlayer such as polyvinyl butyral (PVB). It is known to vary the compressive stress in at least one of the sheets of glass of the laminate to provide desirable mechanical characteristics.

It is also known that the laminated side window may have a construction such that when the side window is fully closed, the sheet of glass facing the interior of the vehicle does not extend fully downwards to the winder mechanism. Instead the winder mechanism is only connected to a connector region that is part of the outer sheet of glass of the laminated glazing. Actuation of the winder mechanism still moves the inner sheet of glass at the same time as the outer sheet of glass because the outer sheet of glass is joined to the inner sheet of glass by the adhesive interlayer material (such as PVB). However, the winder mechanism is not in direct physical contact with the inner sheet of glass.

It is also known to use a sheet of chemically strengthened glass as an inner facing sheet in a vehicle side window, for example as described in U.S. Pat. No. 4,985,099 and US2015/0224855A1. The sheet of chemically strengthened glass may be coextensive with the outer pane of glass or may only cover the aperture portion of the vehicle when the side window is in a closed position as described above.

A problem when the inner facing sheet only covers the aperture portion of the vehicle is that in the event of breakage of the outer sheet of glass, the integrity of the adhesive interlayer material joining the inner glass sheet to the outer glass sheet may also be compromised such that the inner glass sheet may also become broken and/or become detached from the adhesive interlayer material with the potential to cause injury to anyone inside the vehicle.

The present invention aims to at least partially overcome this problem.

Accordingly the present invention provides from a first aspect A laminated glazing comprising: a first sheet of glass joined to a second sheet of glass by an interlayer structure therebetween, the first and second sheets of glass each having a respective first major surface and a second opposing major surface; the interlayer structure comprising at least a first layer of adhesive interlayer material, a second layer of adhesive interlayer material and a support sheet, the support sheet being between the first and second layers of adhesive interlayer material; wherein the laminated glazing is arranged such that the first layer of adhesive interlayer material is between the first sheet of glass and the support sheet, the second layer of adhesive interlayer material is between the second sheet of glass and the support sheet support material and at least a portion of the second major surface of the first sheet of glazing material faces the first major surface of the second sheet of glazing material; further wherein the first sheet of glass is thicker than the second sheet of glass, and the first and second sheets of glass each have a respective glass composition, the glass composition of the first sheet of glass being different to the glass composition of the second sheet of glass.

In the event of breaking the first sheet of glass the integrity of the laminated glazing is maintained because the support sheet between the first and second layers of adhesive interlayer material acts as a support for the first layer of adhesive interlayer material thereby helping some or all the parts of the broken first sheet of glass to remain joined to the support sheet.

Furthermore, in the event of breakage the second sheet of glass may remain joined to the interlayer structure due to the provision of the support sheet in the interlayer structure. The support sheet acts as a support for the second layer of adhesive interlayer material so that the second sheet of glass may remain joined to the support sheet.

Preferably the support material has a higher rigidity than the first and/or second layers of adhesive interlayer material. In order to determine that the support material has a higher rigidity that the first and/or second layer of adhesive interlayer material, the rigidity of the support material and the first and/or second layer of adhesive interlayer material may be determined prior to being incorporated into the laminated glazing. Standard methods in the art may be used to determine rigidity.

Preferably the support material is more dimensionally stable than the first and/or second layers of adhesive interlayer material. The dimensional stability of a material may be measured using a standard method, for example as defined in ASTM D1204 and may be carried out at one or more temperature between 50-150° C. Dimensional stability may be determined prior to being incorporated into the laminated glazing.

Preferably the support sheet is stiffer than the first and/or second layers of adhesive interlayer material. Stiffness may be determined by measuring the extent to which the sample under investigation deforms in response to an applied force. Relative stiffness between the support sheet and the first and/or second layer of adhesive interlayer material may be determined prior to being incorporated into the laminated glazing using standard methods known in the art.

Preferably the support sheet comprises a material having a Young's modulus (often referred to as Modulus of Elasticity, E) between x GPa and y GPa, wherein x is 0.1, 0.2, 0.3, 0.4, 0.5, 1.0 or 1.5 and y is 10, 20, 30, 40, 50, 60, 70, 80, 90 or 100. For example, preferably the support sheet comprises a material having a Young's modulus (E) between 0.1 GPa and 100 GPa. Young's modulus may be determined using standard methods known in the art.

Dynamic mechanical properties may be determined in accordance with a standard method such as ASTM D4065.

It is known in the art that the Young's Modulus of an adhesive interlayer material such as polyvinyl butyral may be determined as a function of temperature and load duration or frequency.

Preferably the support sheet comprises a polyester.

Preferably the support sheet comprises polyethylene terephthalate (PET).

Preferably the support sheet comprises a sheet of glass.

Preferably the support sheet comprises an ionoplast interlayer material such as SentryGlas®.

Preferably the support sheet is monolithic. When the support sheet is monolithic the support sheet may also be referred to as a sheet of support material.

Preferably the support sheet is multi-layered. When the support sheet is multi-layered, the support sheet comprises at least two layers (a first layer and a second layer) that are the same material or are of different materials.

In some embodiments when the support sheet comprises a first layer and a second layer, the second layer may be a coating on the first layer.

In some embodiments when the support sheet comprises a first layer and a second layer, the thickness of the first layer is the same as the thickness of the second layer.

In some embodiments when the support sheet comprises a first layer and a second layer, the thickness of the first layer is different to the thickness of the second layer.

In some embodiments when the support sheet is multi-layered, the support sheet may comprise three layers i.e. a first layer, a second layer and a third layer, wherein the second layer may sandwiched between the first and second layers such that the second layer of the support sheet is in direct contact on one side with the first layer of the support sheet and on the opposing side thereof with the third layer of the support sheet.

In some embodiments when the support sheet is multi-layered having first, second and third layers, the first and third layers of the support sheet may comprise glass or a polyester, such as PET, and the second layer of the support sheet may comprise polyvinyl butyral or a copolymer of ethylene such as ethylene vinyl acetate.

Other embodiments have other preferable features.

Preferably the laminated glazing has a solar control function.

In some embodiments the solar control function of the laminated glazing is provided at least in part by a solar control coating on the first and/or second sheet of glass.

Preferably the first major surface of the first sheet of glass has a solar control coating on a least a portion thereof.

Preferably the second major surface of the first sheet of glass has a solar control coating on a least a portion thereof.

Preferably the first major surface of the second sheet of glass has a solar control coating on a least a portion thereof.

Preferably the second major surface of the second sheet of glass has a solar control coating on a least a portion thereof.

Preferably the solar control coating on the first and/or second major surface of the first and/or second sheet of glass comprises an absorbing coating, in particular a coating for absorbing infrared radiation.

Preferably the solar control coating on the first and/or second major surface of the first and/or second sheet of glass comprises a reflective coating, in particular an infrared ray reflective coating.

When the laminated glazing has a solar control function, the solar control function may be provided at least in part by the first and/or second sheet of glass. For example, the first and/or second sheet of glass may be suitably body tinted.

When the laminated glazing has a solar control function, the solar control function may be provided at least in part by the interlayer structure. The solar control function provided by the interlayer structure may be provided by at least one of the first layer of adhesive layer, the second layer of adhesive and the support sheet.

Preferably the first and/or second layer of adhesive interlayer material comprises functional inclusions for reducing the amount of solar radiation that may otherwise be transmitted through the first layer of adhesive interlayer material.

Preferably the first and/or second layer of adhesive interlayer material comprises absorbers for absorbing solar radiation.

Preferably the support sheet is used to provide the laminated glazing with the solar control function.

Preferably the support sheet has an infrared ray reflecting coating on at least a portion of a major surface thereof.

Preferably the infrared ray reflecting coating comprises at least one layer of a metal, more preferably at least one layer of silver.

Preferably the infrared ray reflecting coating on the support sheet faces the first sheet of glass.

In other embodiments, the first and/or second sheet of glass includes a functional coating.

Preferably the first major surface of the first sheet of glass has a functional coating on a least a portion thereof.

Preferably the second major surface of the first sheet of glass has a functional coating on a least a portion thereof.

Preferably the first major surface of the second sheet of glass has a functional coating on a least a portion thereof.

Preferably the second major surface of the second sheet of glass has a functional coating on a least a portion thereof.

In some embodiments where the first and/or second major surface of the first and/or second sheet of glass has a functional coating on a least a portion thereof, preferably the functional coating comprises an ultra violet ray shielding function and/or a tinting function, such that the passage of visible light and/or ultra violet radiation through the laminated glazing is modified by the presence of the functional coating.

In some embodiments the first major surface of the first sheet of glass and/or the second major surface of the second sheet of glass has a functional coating on a least a portion thereof, and the functional coating comprises a self-cleaning type coating.

In some embodiments the laminated glazing comprises a low emissivity coating on at least a portion of the first and/or second major surface of the first and/or second sheet of glass.

Preferably the low emissivity coating comprises at least one layer of an oxide of a metal such as tin, zinc, indium, tungsten and molybdenum. The at least one layer of an oxide of a metal may comprise a dopant such as fluorine, chlorine, antinomy, tin, aluminium, tantalum, niobium, indium or gallium, so that coatings such as fluorine-doped tin oxide and tin-doped indium oxide may result.

Preferably the low emissivity coating comprises at least one metal layer and preferably at least one dielectric layer. The at least one metal layer preferably comprises silver, gold, copper, nickel or chromium.

Other embodiments have other preferable features.

Preferably the support sheet has a thickness between 50 μm and 1000 μm.

Preferably the support sheet is thinner than the second sheet of glass and the second sheet of glass is thinner than the first sheet of glass.

In some embodiments the first layer of adhesive interlayer material is coextensive with the first sheet of glass.

In some embodiments the first layer of adhesive interlayer material is coextensive with the support sheet.

In some embodiments the first layer of adhesive interlayer material is coextensive with the support sheet and the first sheet of glass.

In some embodiments the first layer of adhesive interlayer material is coextensive with the second layer of interlayer material.

In some embodiments the second layer of adhesive interlayer material is coextensive with the second sheet of glass.

In some embodiments the second layer of adhesive interlayer material is coextensive with the support sheet.

In some embodiments the second layer of adhesive interlayer material is coextensive with second sheet of glass, the support sheet and the first layer of adhesive interlayer material.

Other embodiments of the present invention have other preferable features.

Preferably the first sheet of glass is a coated sheet, there being a coating on the first and/or second major surface of the first sheet of glass. The coating on the first and/or second major surface of the first sheet of glass may be a low emissivity coating or a solar control coating. Such coatings are known in the art and may comprise one or more layer of silver.

Preferably the thickness of the first sheet of glass is between 1 mm and 8 mm, preferably between 1.3 mm and 6 mm.

Preferably the first sheet of glass is a sheet of float glass.

Preferably the first sheet of glass is a sheet of soda-lime-silicate glass.

Preferably the first sheet of glass has a composition comprising (by weight), $SiO_2$ 69-74%; $Al_2O_3$ 0-3%; $Na_2O$ 10-16%; $K_2O$ 0-5%; MgO 0-6%; CaO 5-14%; SO3 0-2% and $Fe_2O_3$ 0.005-2%.

Whilst the first sheet of glass may be coextensive with the second sheet of glass, it is preferred that the second sheet of glass has an outer periphery that is enclosed within an outer periphery of the first sheet of glass. When the second sheet of glass has an outer periphery that is enclosed within an outer periphery of the first sheet of glass, preferably at least a portion of the outer periphery of the second sheet of glass is aligned with at least a portion of the outer periphery of the first sheet of glass.

Preferably the first sheet of glass is a sheet of thermally toughened glass or thermally semi-toughened glass.

Preferably the first sheet of glass has a thickness between 1.3 mm and 1.49 mm and a surface compressive stress in at least a central region of the first major surface of the first sheet of glass sheet in the range of 18 MPa to 23 MPa.

Preferably the first sheet of glass has a thickness between 1.5 mm and 1.69 mm and a surface compressive stress in at least a central region of the first major surface of the first sheet of glass in the range of 23.1 MPa to 26 MPa.

Preferably the first sheet of glass has a thickness between 1.7 mm and 1.99 mm and a surface compressive stress in at least a central region of the first major surface of the first sheet of glass in the range of 26.1 MPa to 30 MPa.

Preferably the first sheet of glass has a thickness between 2.0 mm and 2.19 mm and a surface compressive stress in at least a central region of the first major surface of the first sheet of glass in the range of 30.1 MPa to 35 MPa.

Preferably the first sheet of glass has a thickness between 2.2 mm and 2.49 mm and a surface compressive stress in at least a central region of the first major surface of the first sheet of glass in the range of 35.1 MPa to 45 MPa.

Preferably the first sheet of glass has a thickness between 2.5 mm and 2.7 mm and a surface compressive stress in at least a central region of the first major surface of the first sheet of glass in the range of 45.1 MPa to 65 MPa.

Preferably the first sheet of glass has a thickness between 2.71 mm and 6 mm and a surface compressive stress in at least a central region of the first major surface of the first sheet of glass in the range of 65.1 MPa to 150 MPa, more preferably in the range of 65.1 MPa to 100 MPa.

Preferably the support sheet has a thickness between 50 μm and 1000 μm.

Preferably the thickness of the second sheet of glass is less than 1.0 mm, preferably less than 0.8 mm.

Preferably the thickness of the second sheet of glass is greater than 0.3 mm.

Preferably the thickness of the second sheet of glass is between 0.3 mm and 1.0 mm.

Preferably the thickness of the second sheet of glass is between 0.3 mm and 0.8 mm.

Preferably the second sheet of glass has been chemically strengthened.

Preferably the second sheet of glass is an alkali aluminosilicate glass composition.

Preferably the second sheet of glass includes at least about 6 wt % aluminium oxide.

Preferably the second sheet of glass has a composition comprising 66-72 mol. % $SiO_2$, 1-4 mol. % $Al_2O_3$, 8-15 mol. % MgO, 1-8 mol. % CaO, 12-16 mol. % $Na_2O$, preferably wherein MgO+CaO is between 12 and 17 mol. % and CaO/(MgO+CaO) is in the range 0.1 and 0.4.

Preferably the second sheet of glass has a composition comprising (by weight) 58% to 70% $SiO_2$, 5% to 15% $Al_2O_3$, 12% to 18% $Na_2O$, 0.1% to 5% $K_2O$, 4% to 10% MgO and 0% to 1% CaO with the provisos that the sum of the $Al_2O_3$ and MgO exceeds 13%, that the sum of the amounts of $Al_2O_3$ plus MgO divided by the amount of $K_2O$ exceeds 3 and that the sum of the $Na_2O$ plus $K_2O$ plus MgO exceeds 22%.

Preferably the second sheet of glass is chemically strengthened to have a surface compressive stress greater than 400 MPa, preferably between 400 MPa and 900 MPa, more preferably between 400 MPa and 700 MPa, even more preferably between 450 MPa and 675 MPa.

Preferably the second sheet of glass is chemically strengthened to have a surface compressive stress of around 900 MPa or less.

Preferably the second sheet of glass is chemically strengthened to have a depth of layer (DOL) between 10 μm and 60 μm, more preferably between 25 μm and 45 μm, even more preferably between 30 μm and 40 μm.

Preferably the first layer of adhesive interlayer material comprises polyvinyl butyral (PVB), acoustic modified PVB, a copolymer of ethylene such as ethylene vinyl acetate (EVA), polyurethane (PU), polycarbonate, poly vinyl chloride (PVC) or a copolymer of ethylene and methacrylic acid.

Preferably the first layer of adhesive interlayer material has a thickness between 0.3 mm and 2.3 mm, more preferably between 0.3 mm and 1.6 mm, even more preferably between 0.3 mm and 0.9 mm.

The first layer of adhesive interlayer material has a first major surface and a second opposing major surface.

The second layer of adhesive interlayer material has a first major surface and a second opposing major surface.

The first sheet of glass has a first major surface and a second opposing major surface.

The second sheet of glass has a first major surface and a second opposing major surface. The sheet of support material has a first major surface and a second opposing major surface.

In embodiments of the present invention the laminated glazing is arranged such that: (i) the first major surface of the first layer of adhesive interlayer material faces the second major surface of the first sheet of glass; (ii) the second major surface of the first layer of adhesive interlayer material faces the first major surface support sheet; (iii) the second major surface of the support sheet faces the first major surface of the second layer of adhesive interlayer material; and (iv) the second major surface of the second layer of adhesive interlayer material faces the first major surface of the second sheet of glass.

Preferably the first layer of adhesive interlayer material is in direct contact with the second major surface of the first sheet of glass.

Preferably the first layer of adhesive interlayer material is in direct contact with the first major surface of the support sheet.

Preferably the second layer of adhesive interlayer material is in direct contact with the first major surface of the second sheet of glass.

Preferably the second layer of adhesive interlayer material is in direct contact with the second major surface of the support sheet.

Preferably the first layer of adhesive interlayer material is in direct contact with the second major surface of the first sheet of glass and the first major surface of the support sheet.

Preferably the second layer of adhesive interlayer material is in direct contact with the second major surface of the support sheet and the first major surface of the second sheet of glass.

Preferably the first layer of adhesive interlayer material is in direct contact with the second major surface of the first sheet of glass and the first major surface of the sheet of support material and wherein the second layer of adhesive interlayer material is in direct contact with the second major surface of the support sheet and the first major surface of the second sheet of glass.

The first and second sheets of glass each have a periphery. Preferably the periphery of the second sheet of glass is contiguous with the periphery of the first sheet of glass or the periphery of the second sheet of glass is enclosed within the periphery of the first sheet of glass.

When the periphery of the second sheet of glass is enclosed within the periphery of the first sheet of glass, a portion of the periphery of the first sheet of glass may be aligned with a portion of the periphery of the second sheet of glass.

Preferably the first and/or second sheet of glass comprises a respective first connection portion for connecting the laminated glazing to a mechanism for moving the laminated glazing, preferably in a vertical direction.

In use the first connection portion of the first or second sheet of glass may be between the lower edge of the second sheet of glass and the mechanism.

Preferably the first connection portion is in mechanical communication with the respective sheet of glass but is not integrally formed therewith.

In some embodiments the first sheet of glass comprises a hole therein to define a first connection portion, further wherein the first layer of adhesive interlayer material has a hole therein and the hole in the first layer of interlayer material is concentric with the hole in the first sheet of glass.

In such embodiments the hole in the first sheet of glass and the hole in the first layer of adhesive interlayer material are preferably the same shape, more preferably circular in shape.

In some embodiments where the first sheet of glass comprises a hole therein to define the first connection portion, the support sheet has a hole therein and the hole in the support sheet is concentric with the hole in the first layer of adhesive interlayer material.

In such embodiments the hole in the support sheet and the hole in the first layer of adhesive interlayer material are the preferably the same shape, preferably circular.

From a second aspect the present invention provides a vehicle having an aperture for a window, in particular a side window, wherein a laminated glazing according to the first aspect of the present invention is movable or fixed within the aperture.

In some embodiments of the second aspect of the present invention, the laminated glazing according to the first aspect of the present invention is configured such that the first and/or second sheet of glass comprises a respective first connection portion for connecting the laminated glazing to a mechanism for moving the laminated glazing, preferably in a vertical direction, and the laminated glazing is movable in the aperture in the vehicle by means of the mechanism connected to the first connection portion of the first or second sheet of glass.

Preferably the laminated glazing is vertically movable in the aperture.

Suitably the vehicle has an interior and the aperture has a periphery, wherein the laminated glazing is movable to a first position to close the aperture such that from the outside of the vehicle, the interior of the vehicle is not accessible via the aperture, and when the laminated glazing is in the first position there is a portion of the laminated glazing not facing the aperture and a portion of the second major surface of the first sheet of glass is not directly facing the first major surface of the second sheet of glass.

The present invention will now be described with reference to the following figures (not to scale) in which.

In the following description of the present invention, surface compressive stress measurements are made using a Strainoptics Laser GASP-CS (http://www.strainoptics.comi-files/Laser%20GASP-CS%20Quick-Start%20(English).pdf). Such equipment is available from Strainoptics, Inc., 108 W. Montgomery Avenue, North Wales, Pa. 19454 USA.

Figure 1:
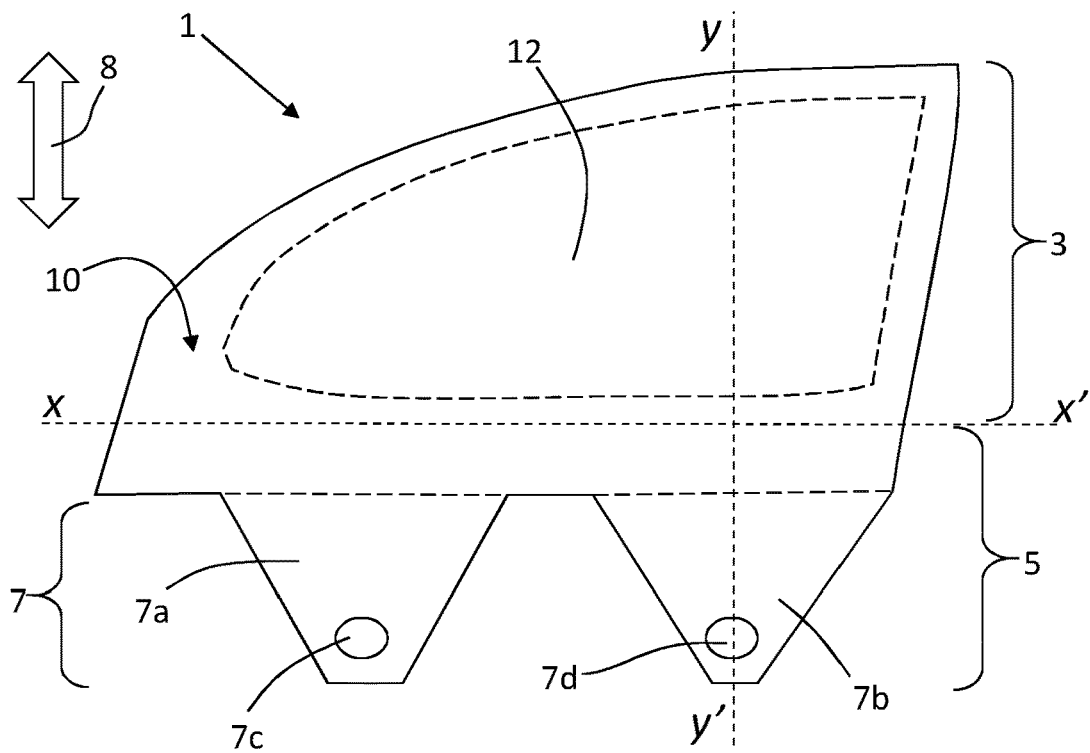
FIG. 1 is a schematic plan view of a vehicle side window in accordance with the first aspect of the present invention.

FIG. 1 shows a plan view of a vehicle side window 1. In plan view, the vehicle side window 1 has an upper region 3, a lower region 5 and a connection region 7.

The upper region 3 is defined in relation to a line x-x', and the line x-x' is defined by the styling of the vehicle into which the vehicle side window is installed, as will be discussed in more detail below. In this example the connection region 7 comprises a first trapezoidal portion 7a and a second trapezoidal portion 7b. Each trapezoidal portion 7a, 7b has a respective hole 7c, 7d at the narrow end thereof. The holes 7c, 7d are used to connect a winder mechanism (not shown) to the vehicle side window 1 to move the vehicle side window vertically, i.e. in the direction of arrow 8.

The vehicle side window 1 has a major surface 10 configured for use as an outer surface. The major surface 10 has a central region 12, the central region being inboard of the periphery of the vehicle side window 1.

Figure 2:
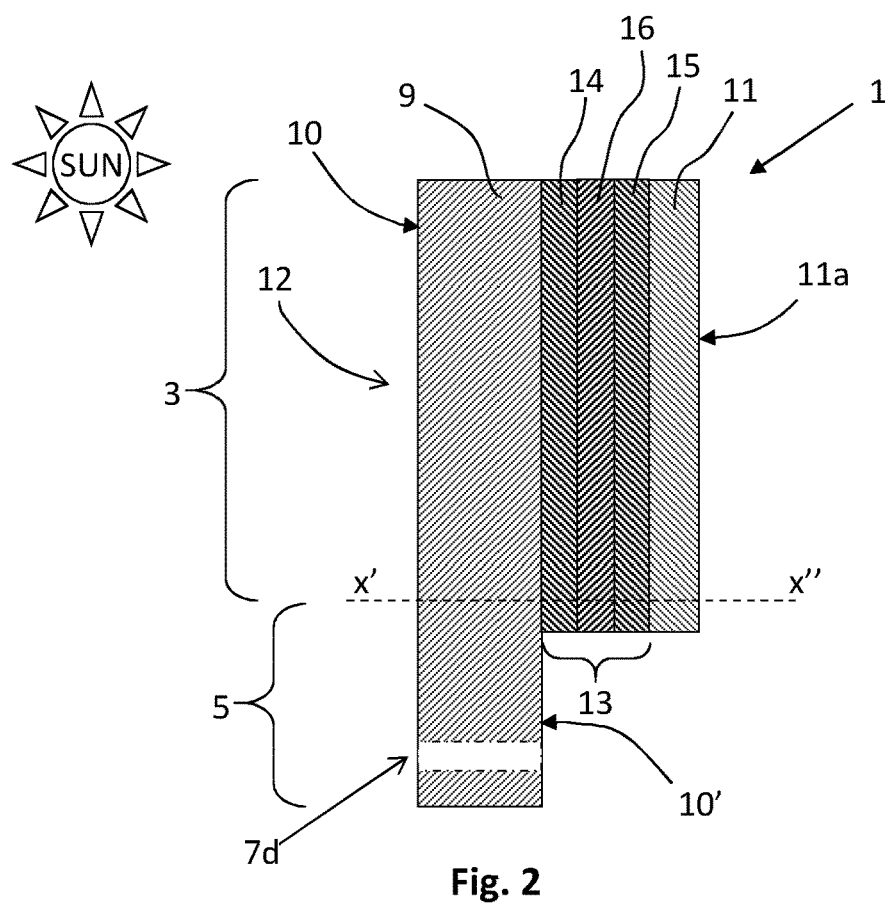
FIG. 2 is a schematic cross-sectional representation of the vehicle side window shown in FIG. 1.

FIG. 2 shows a schematic cross-sectional view of the vehicle side window 1 shown in FIG. 1 taken through the line y-y'. The line x'-x" forms a horizontal plane with the line x-x'.

The vehicle side window 1 comprises a first sheet of glass 9 joined to a second sheet of glass 11 by an interlayer structure 13 consisting of a first layer of polyvinyl butyral (PVB) 14, a second layer of PVB 15 and a support sheet 16. In this example the support sheet is a 250 μm thick sheet of PET, although the thickness of the support sheet may be thicker or thinner. If the support sheet is more rigid, the thickness thereof may be reduced.

The first layer of PVB 14 has a thickness of 0.38 mm and the second layer PVB 15 has a thickness of 0.38 mm. Each of the first and second layers of PVB may have a different thickness, for example 0.76 mm or 0.82 mm or 0.86 mm. The first and/or second layer of PVB may be acoustic modified PVB having a thickness of about 0.5 mm.

The sheet of PET 16 is between the first and second layers of PVB 14, 15. The sheet of PET 16 has a first major surface and a second opposing major surface. One major surface of the sheet of PET 16 is in direct contact with the first layer of PVB 14 and the other major surface of sheet of PET 16 is in direct contact with the second layer of PVB 15.

It is possible that the first and/or second major surface of the sheet of PET 16 may have a coating thereon, for example a scratch resistant coating and/or a solar control coating and/or an infrared reflecting coating, in which case the first and/or second major surface of the sheet of PET 16 is a coated surface and the first and/or second layer of PVB 14, 15 will be in direct contact with the respective coating and not with PET (because the coating is directly on the PET).

The first sheet of glass 9 has a second major surface 10' opposite the first major surface 10 thereof. The first layer of PVB 14 is in direct contact with the second major surface 10'.

The second sheet of glass 11 has a first major surface (not labelled) and a second opposing major surface 11a. The second layer of PVB 15 is in direct contact with the first major surface of the second sheet of glass 11.

The second major surface 10' of the first sheet of glass 9 may have a coating thereon, in which case the second major surface 10' of the first sheet of glass would be a coated glass surface. In such an embodiment, the first layer of PVB 14 would be in contact with the coating on the second major surface 10' of the first sheet of glass 9.

Similarly, the first major surface of the second sheet of glass 11 may have a coating thereon, in which case the first major surface of the second sheet of glass is a coated glass surface. In such an embodiment, the second layer of PVB 15 would be in contact with the coating on the first major surface of the second sheet of glass 11.

It is also possible that the outer facing surfaces 10, 11a of the laminated glazing may have a coating thereon.

Using conventional nomenclature, the major surface 10 is known as "surface 1" because it is the first surface of the glazing facing the "outside", i.e. in normal use, the major surface 10 of the vehicle side window 1 is the surface a ray of sunlight strikes first.

The first sheet of glass 9 is a sheet of soda-lime-silicate glass having a composition such as clear float glass, typically with the addition of iron oxide as a tinting agent to provide the laminated glazing with some form of solar control.

A typical soda-lime-silicate glass composition is (by weight), $SiO_2$ 69-74%; $Al_2O_3$ 0-3%; $Na_2O$ 10-16%; $K_2O$ 0-5%; MgO 0-6%; CaO 5-14%; SO3 0-2%; $Fe_2O_3$ 0.005-2%. The glass composition may also contain other additives, for example, refining aids, which would normally be present in an amount of up to 2%. The soda-lime-silicate glass composition may contain other colouring agents such as $Co_3O_4$, NiO and Se to impart to the glass a desired colour when viewed in transmitted light. The transmitted glass colour may be measured in terms of a recognised standard such as BS EN410.

In this example the first sheet of glass 9 has a thickness of 2.1 mm and has been thermally semi-toughened using a conventional high pressure cooling air technique such that the compressive stress in at least the central region 12 of the first major surface of the first sheet of glass is around 33 MPa.

The second sheet of glass 11 has a thickness of 0.7 mm but may have a thickness in the range of 0.3 mm to 0.8 mm, for example 0.4 mm to 0.8 mm. The second sheet of glass 11 may have a thickness of 0.5 mm.

The second sheet of glass has been chemically strengthened using a conventional molten salt ion exchange process to exchange sodium ions in the surface of the second sheet of glass with potassium ions from a suitable molten salt. The chemical strengthening process is controlled to provide the second sheet of glass with a depth of layer (DOL) of 35 μm and a surface compressive stress greater than 400 MPa, typically between 450 MPa and 700 MPa. The surface compressive stress may be as high as 900 MPa. The DOL may be between 30 μm and 40 μm.

A suitable glass composition for the second sheet of glass 13 is an alkali aluminosilicate glass such as Gorilla™ glass available from Corning Incorporated.

A specific composition for the second sheet of glass 11 is 68 mol % $SiO_2$, 2.5 mol % $Al_2O_3$, 11 mol % MgO, 3.7 mol % CaO, 14.2 mol % $Na_2O$, 0.6 mol % $K_2O$. For this composition MgO+CaO is 14.7 mol % and $Na_2O+K_2O$ is 14.8 mol %. This is composition number 13 in table 2 on page 20 of WO2014/148020A1 as published. The iron oxide ($Fe_2O_3$) content of the second sheet may be low, being less than 0.1 percent by weight i.e. about 0.012 percent by weight.

As shown in FIG. 2, the hole 7d passes through the first sheet of glass 9 and extends between the first and second major surface 10, 10' thereof. The hole 7c also passes through the first sheet of glass 9. The holes 7c, 7d help define the position of the connection region 7.

As FIG. 2 shows, the interlayer structure 13 and the second sheet of glass 11 extend below the line x'-x", and consequently below the line x-x' in FIG. 1. The first and second layers of PVB 14, 15, the sheet of PET 16 and the second sheet of glass 11 are not coextensive with the first sheet of glass 9. This results in the connection region 7 not being covered by the first and second layers of PVB 14, 15, the sheet of PET 16 and the second sheet of glass 11 so that a conventional winder mechanism (not shown) may be attached to the connection region 7 i.e. via holes 7c (not shown in FIG. 2) and 7d.

The interlayer structure 13, prior to lamination, may be formed from three separate sheets i.e. a sheet of PVB 14, a sheet of PET 16 and a sheet of PVB 15. Alternatively, the interlayer structure may be at least partly preformed prior to lamination, for example the first and/or second layer of PVB 14, 15 may be joined to the sheet of PET 16 prior to the lamination process to join the first sheet of glass 9 to the second sheet of glass 11 by means of the interlayer structure 13. For example, the first layer of PVB 14 may be joined to the sheet of PET 16 prior to lamination. Such a composite structure is available commercially for spall protection, for example Spallshield® available from Kuraray (www.trosifol.com). Typically, in such a composite structure product, the surface of the PET not in contact with PVB is usually coated with an abrasion resistant hard coat.

Conventional lamination processes may be used to join the first sheet of glass 9 to the second sheet of glass 11 by means of the interlayer structure 13.

Although the first and second sheets of glass 9, 11 are shown as flat (or planar), it is possible for the laminated glazing 1 to be curved in at least one direction. In such embodiments the first sheet of glass 9 may be suitably curved prior to lamination whilst the second sheet of glass 11 is flat prior to lamination. Due to the relative flexibility of the second sheet of glass 11, during lamination the second sheet of glass 11 may be held against the interlayer structure 13 to conform to the shape of the curved first sheet of glass 9. Such a process is often referred to as "cold forming" in the art.

Figure 3:
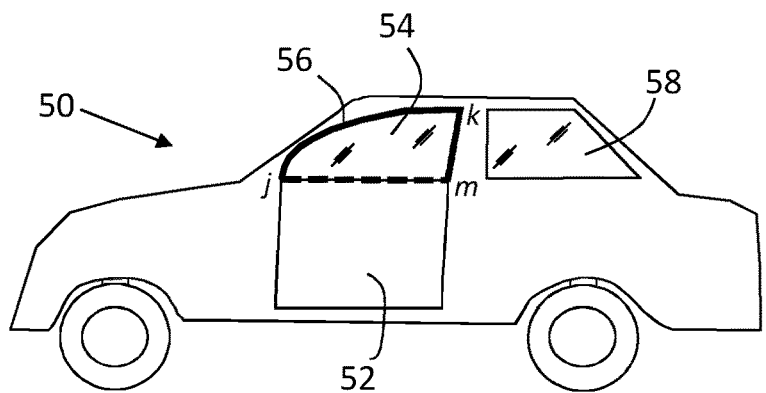
FIG. 3-6 are schematic side views of a vehicle having a vehicle side window.

FIG. 3 shows a schematic side view of a vehicle 50 (i.e. a car). The vehicle 50 has a side door 52 and an aperture 54 having a periphery 56 in which a vehicle side window of the type shown in FIGS. 1 and 2 is vertically movable therein in a manner known in the art. The periphery 56 may be defined by part of the vehicle door i.e. a suitable frame, or a part of the vehicle body.

The periphery 56 has corners j, k and m. The line j-m defines the position of the line x-x' shown in FIG. 1. In FIG. 3 the aperture 54 is shown in a closed configuration with the vehicle side window closing the aperture 54. With reference to FIGS. 1 and 2, a portion of the major surface 10 of the first sheet of glass closes the aperture 54.

Also shown in FIG. 3, the vehicle 50 has a fixed side window 58 that may have a configuration in accordance with the present invention. However, as the side window 58 is fixed in a frame, there is no need for the side window 58 to have a connection region for connecting a winder mechanism to the side window 58.

Figure 4:
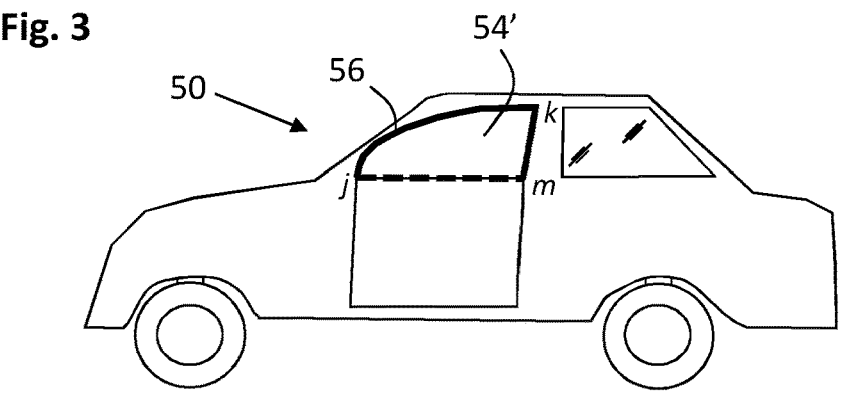

FIG. 4 shows the vehicle 50 with the aperture 54' in a second configuration with the vehicle side window wound fully down.

With reference to FIGS. 1-3, FIG. 5 shows vehicle 50 having a side door 52 incorporating a vehicle side window 1 movable in aperture 54. In this figure, the vehicle side window 1 below the line x-x' (i.e. the line j-m defined by the aperture) is shown in phantom. Located in a lower portion of the door 52 is a winder mechanism 60. A suitable linkage 62 connects the winder mechanism 60 to the connection region of the vehicle side window 1. A first linkage member 63 is in mechanical communication with the first trapezoidal portion 7a and a second linkage member 64 is in mechanical communication with the second trapezoidal portion 7b. The holes 7c, 7d may be used to attach an end of the respective linkage member 63, 64 to the respective trapezoidal portion 7a, 7b.

The aperture 54 is closed by the upper region 3 of the vehicle side window 1.

Figure 5:
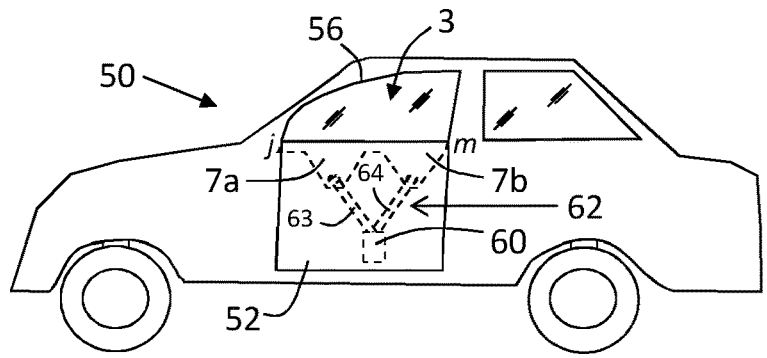
Figure 6:
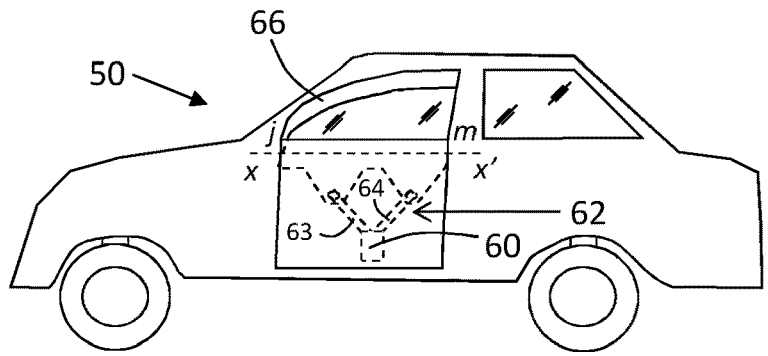

FIG. 6 shows the vehicle 50 shown in FIG. 5 where the winder mechanism 60 has been suitable actuated to wind the vehicle side window partially down such that there is an opening 66 in the aperture 54 i.e. the aperture is no longer fully closed. By actuation of the winder mechanism 60 the winder linkage 62 moves from the first position shown in FIG. 5 to the second position shown in FIG. 6. Each of the first and second linkages 63, 64 are suitably moved towards the winder mechanism 60 thereby lowering the vehicle side window in the aperture. Consequently, the line x-x' on the vehicle side window 1 moves below the line j-m defined by the aperture 54. The interior of the vehicle 50 is accessible via the opening 66.

Figure 7:
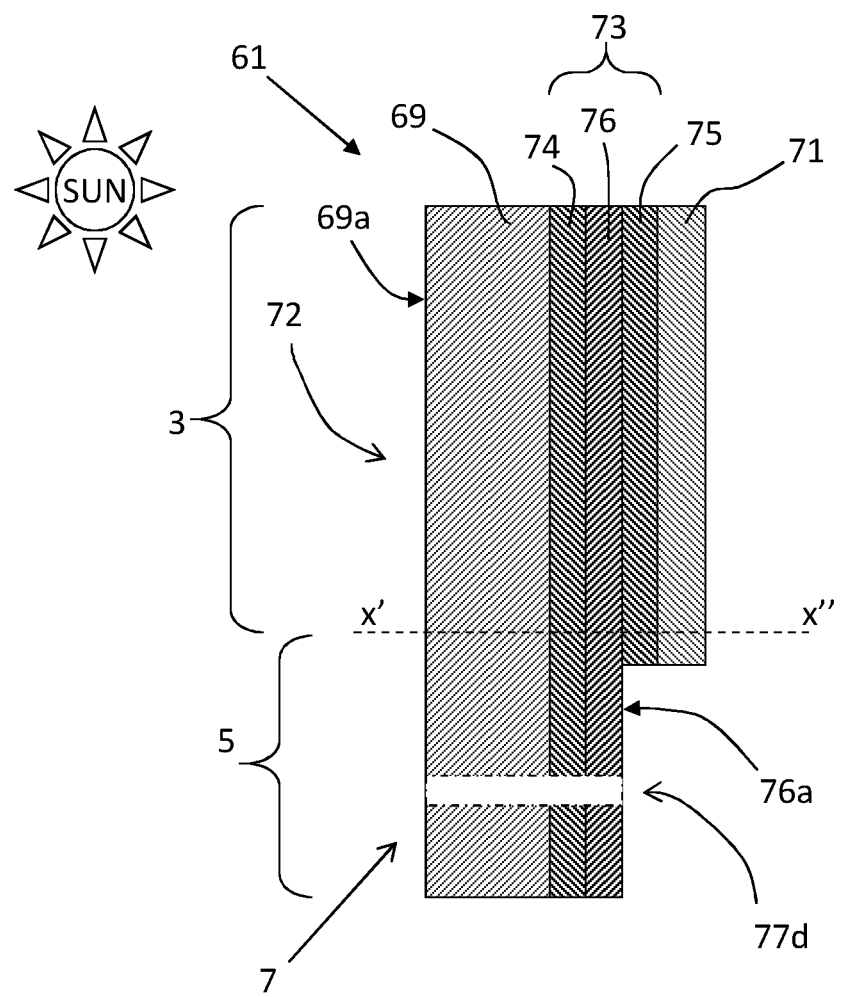
FIG. 7 is schematic cross-sectional representation of another vehicle side window in accordance with the first aspect of the present invention having the same plan view as shown in FIG. 1.

FIG. 7 shows a schematic cross-sectional representation of another laminated glazing in accordance with the present invention.

The laminated glazing 61 is a vehicle side window and is similar to the vehicle side window 1 described with reference to FIGS. 1 and 2. As in FIG. 2 the line x'-x" forms a horizontal plane with the line x-x'. The regions 3, 5 and 7 are defined in the same way as with reference to FIG. 1 and the laminated glazing 61 has the same plan view as the laminated glazing shown in FIG. 1.

The laminated glazing 61 has a first sheet of glass 69 joined to a second sheet of glass 71 by means of interlayer structure 73.

The interlayer structure 73 consists of a first layer of PVB 74 having a thickness of 0.76 mm, a second layer of PVB 75 having a thickness of 0.76 mm and a sheet of PET 76 having a thickness of 400 μm. The sheet of PET 76 is between the first and second layers of PVB 74, 75.

The sheet of PET 76 is coextensive with the first layer of PVB 74 and may be part of a composite structure of the type discussed above, for example the layer of PVB 74 may be joined to the sheet of PET 76 prior to lamination i.e. a composite structure as used for spall protection. The exposed major surface 76a of the sheet of PET 76 may have an anti-abrasion hard coat thereon. Prior to being incorporated into the laminated glazing 61, such an anti-abrasion coating may extend over the entire exposed major surface of the sheet of PET 76. In this case, the PVB layer 75 would be in direct contact with the anti-abrasion coating instead of being in direct contact with the PET sheet 76.

The second layer of PVB 75 is coextensive with the second sheet of glass 71. However, the second layer of PVB 75 and the second sheet of glass 71 are not coextensive with the first sheet of glass 69, or the sheet of PET 76 or the first layer of PVB 74. The upper edges of the second sheet of glass 71 and the second layer of PVB 75 in the upper region 3 are aligned. The lower edges of the second sheet of glass 71 and the second layer of PVB 75 are below the line x-x' and are aligned but are spaced apart from the lower edges of the first sheet of glass 69, the first layer of PVB 74 and the PET sheet 76. Consequently, the second sheet of glass 71 has an outer periphery that is enclosed with the outer periphery of the first sheet of glass and a portion of the outer periphery of the second sheet of glass is aligned with a portion of the outer periphery of the first sheet of glass in the upper region 3.

The first sheet of glass 69 is a sheet of soda-lime-silicate glass having a composition such as clear float glass, typically with the addition of iron oxide as a tinting agent to provide the laminated glazing with some form of solar control.

In this example the first sheet of glass 69 has a thickness of 4.85 mm and has been thermally toughened using a conventional high pressure cooling air technique such that the compressive stress in at least the central region 72 of the first sheet of glass 69 is around 90 MPa.

The second sheet of glass 71 has a thickness of 0.6 mm but may have a thickness in the range of 0.3 mm to 0.8 mm, for example 0.4 mm to 0.8 mm. The second sheet of glass 71 may have a thickness of 0.5 mm or 0.7 mm.

The second sheet of glass 71 has been chemically strengthened using a conventional molten salt ion exchange process to exchange sodium ions in the surface of the second sheet of glass with potassium ions from a suitable molten salt. The chemical strengthening process is controlled to provide the second sheet of glass with a depth of layer (DOL) of 35 µm and a surface compressive stress greater than 400 MPa, typically between 450 MPa and 700 MPa. The surface compressive stress may be as high as 900 MPa. The DOL may be between 30 µm and 40 µm.

A specific composition for the second sheet of glass 71 is 68 mol % $SiO_2$, 2.5 mol % $Al_2O_3$, 11 mol % MgO, 3.7 mol % CaO, 14.2 mol % $Na_2O$, 0.6 mol % $K_2O$. For this composition MgO+CaO is 14.7 mol % and $Na_2O+K_2O$ is 14.8 mol %. This is composition number 13 in table 2 on page 20 of WO2014/148020A1 as published. The iron oxide ($Fe_2O_3$) content of the second sheet may be low, being less than 0.1 percent by weight i.e. about 0.012 percent by weight.

As shown in FIG. 7, a hole 77*d* passes through the first sheet of glass 69, the first layer of PVB 74 and the sheet of PET 76.

As FIG. 7 shows, part of the interlayer structure 73 extends below the line x'-x", and consequently below the line x-x' in FIG. 1.

The first layer of PVB 74 is coextensive with both the sheet of PET 76 and the first sheet of glass 71 (other than at the hole 77*d*). As such, the first layer of PVB 74 and the sheet of PET 76 extend below the line x'-x" (and x'-x') to cover the lower region 5 and the connection region 7. The region of the hole 77*d* is also surrounded by PVB (from PVB layer 74) and PET (from the sheet of PET 76).

In an alternative embodiment to that shown, the hole 7*d* is still surrounded by PVB and PET but either or both the first layer of PVB 74 and the sheet of PET 76 are not coextensive with the first sheet of glass 69.

In the event of breakage of the first sheet of glass 69, for example by an impact on "surface 1" of the laminated glazing 61 (i.e. major surface 69*a* of the first sheet of glass 69), the sheet of PET 76 acts to support the second layer of PVB 75 so that the second sheet of glass 71 does not become detached from the laminated glazing 61. Even in the event of a breach of the sheet of PET 76, the supporting function thereof may still be adequate to allow the second sheet of glass 71 to remain attached to the PET sheet 76 by means of the second layer of PVB 75.

In an alternative example to the embodiment shown in FIG. 7, the PET sheet 76 is replaced with a PET sheet having an infrared ray reflecting coating on major surface thereof. It is preferred that the infrared ray reflecting coating is arranged to face the first sheet of glass 69 (and consequently the first layer of PVB 74). If the infrared ray reflecting coating is on the opposite major surface of the PET sheet 76 and arranged to face the second sheet of glass, then the infrared ray reflecting coating will be exposed to the external environment in the region where the second layer of PVB 75 does not cover the PET sheet 76. This is not preferred because the exposed infrared ray reflecting coating is susceptible to corrosion and/or other damage.

Figure 8:
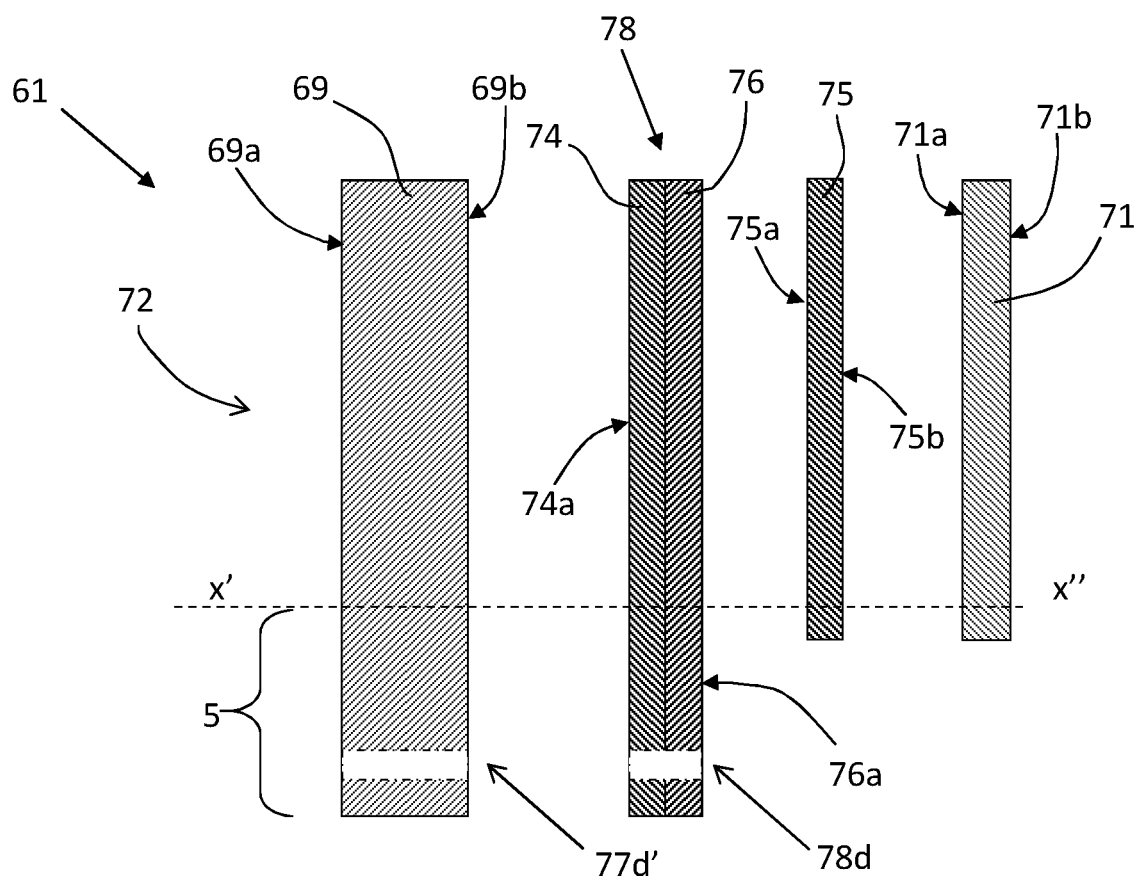
FIG. 8 is a schematic cross-sectional exploded representation of the vehicle side window shown in FIG. 7.

FIG. 8 is an exploded schematic of the laminated glazing 61 shown in FIG. 7. FIG. 8 is illustrative of the individual components making up the laminated glazing 61 prior to the lamination process.

As more clearly seen in FIG. 8, the first sheet of glass 69 has a first major surface 69*a* and a second opposing major surface 69*b*. The second sheet of glass 71 has a first major surface 71*a* and a second opposing major surface 71*b*. The second layer of PVB 75, which prior to lamination may conveniently be in sheet form, has a first major surface 75*a* and a second opposing major surface 75*b*.

The first layer of PVB 74 is joined to the sheet of PET 76 as a composite ply 78, for example a sheet of Spallshield® sold by Kuraray (www.trosifol.com). The major surface 76*a* may be an anti-abrasion coating on the sheet of PET 76.

There is a hole 78*d* in the composite ply 78 positioned such that in the final laminate the hole 78*d* is aligned with the hole 77*d'* in the first sheet of glass 69.

To produce the laminate 61, the first sheet of glass is initially placed onto a suitable support such that the second major surface 69*b* faces upwards. Next the composite ply 78 is placed onto the first sheet of glass 69 such that the PVB layer 74 is on the on second major surface 69*b*, the hole 77*d* is aligned with the hole 78*d* and the major surface 76*a* faces upwards. Next a second sheet of PVB 75 is positioned on the major surface 76*a* such that the major surface 75*b* faces upwards. Finally, the second sheet of glass 71 is positioned on the sheet of PVB 75. The entire assembly of first sheet of glass, composite ply 78, second sheet of PVB 75 and second sheet of glass 71 is then laminated using conventional lamination conditions.

Instead of a composite ply 78, a separate sheet of PVB 74 and a separate sheet of PET 76 may be used.

Although in the previous figures the vehicle side windows 1, 61 are shown as being flat (or planar) having a flat outer surface, the vehicle side window 1, 61 may be curved in one or more directions. The radius of curvature in one of the one or more directions may be between 1000 mm and 8000 mm. When the laminated glazing is curved in two directions, suitably each direction of curvature is orthogonal to the other. Suitably the radius of curvature in one or both directions of curvature is between 1000 mm and 8000 mm.

Suitable techniques are known for shaping the first sheet of glass. However, the second sheet of glass may be initially flat and "cold formed" to the desired shape set by the curved first sheet of glass by applying suitable pressure to the flat second sheet of glass during the lamination process. The temperature during the lamination process is sufficient to cause to the adhesive layer (i.e. a sheet of PVB) to bond to the first and second sheets of glass, but such temperature is not sufficient to cause the second sheet of glass alone to be deformed by pressing between complementary shaping members and/or sagging under the influence of gravity.

It is known in the art that an adhesive layer used to join a first sheet of glass to a second sheet of glass may have a wedged profile, for example of the type used to provide a ghost-free head-up display windshield as described in U.S. Pat. No. 5,013,134. Such a wedged adhesive layer may be useful in the present invention, for example as the first layer of adhesive interlayer material and/or the second layer of adhesive interlayer material.

The present invention finds particular application in the field of vehicle glazings, especially vehicle side windows that may be movable within an aperture in the vehicle or fixed in an aperture in the vehicle. The laminated glazings may be used in the rear of a vehicle (i.e. as part or all of a vehicle backlight) or in the roof of a vehicle.

The present invention therefore provides a laminated glazing comprising first and second sheets of glass joined together by an interlayer structure. The interlayer structure comprises at least first and second layers of adhesive interlayer material with a support sheet therebetween. The laminated glazing is arranged such that the first layer of adhesive interlayer material is between the first sheet of glass and the support sheet, the second layer of adhesive interlayer material is between the second sheet of glass and the support sheet support material and at least a portion of the second major surface of the first sheet of glazing material faces the first major surface of the second sheet of glazing material. In the event of breakage of the first sheet of glass, the second layer of adhesive interlayer material remains attached to the support sheet thereby keeping the second glass sheet from becoming detached from the laminated glazing. The laminated glazing may be fixed or movable in an aperture in a vehicle, for example the aperture being a vehicle window.

The present invention has the following aspects.

Aspect 1. A laminated glazing comprising: a first sheet of glass joined to a second sheet of glass by an interlayer structure therebetween, the first and second sheets of glass each having a respective first major surface and a second opposing major surface, the interlayer structure comprising at least a first layer of adhesive interlayer material, a second layer of adhesive interlayer material and a support sheet, the support sheet being between the first and second layers of adhesive interlayer material, wherein the laminated glazing is arranged such that the first layer of adhesive interlayer material is between the first sheet of glass and the support sheet, the second layer of adhesive interlayer material is between the second sheet of glass and the support sheet support material and at least a portion of the second major surface of the first sheet of glazing material faces the first major surface of the second sheet of glazing material;

further wherein the first sheet of glass is thicker than the second sheet of glass, and the first and second sheets of glass each have a respective glass composition, the glass composition of the first sheet of glass being different to the glass composition of the second sheet of glass.

Aspect 2. A laminated glazing according to aspect 1, wherein the support sheet has a higher rigidity than the first and/or second layers of adhesive interlayer material.

Aspect 3. A laminated glazing according to aspect 1 or aspect 2, wherein the support sheet is more dimensionally stable than the first and/or second layers of adhesive interlayer material.

Aspect 4. A laminated glazing according to any of the aspects 1 to 3, wherein support sheet is stiffer than the first and/or second layers of adhesive interlayer material.

Aspect 5. A laminated glazing according to any of the aspects 1 to 4, wherein the support sheet has a Young's modulus between 0.1 and 100 GPa.

Aspect 6. A laminated glazing according to any of the aspects 1 to 5, wherein the support sheet comprises a polyester, in particular polyethylene terephthalate (PET), or a sheet of glass or an ionoplast interlayer material.

Aspect 7. A laminated glazing according to any of the aspects 1 to 6, wherein the support sheet is monolithic or multi-layered.

Aspect 8. A laminated glazing according to aspect 7, wherein the support sheet is multi-layered and comprises at least two layers (a first layer and a second layer) that are of the same material or are of different materials.

Aspect 9. A laminated glazing according to aspect 8, wherein the second layer is a coating on the first layer.

Aspect 10. A laminated glazing according to aspect 8 or aspect 9, wherein the thickness of the first layer is different or the same as the thickness of the second layer.

Aspect 11. A laminated glazing according to any of the aspects 7 to 10, wherein the support sheet is multi-layered and comprises three layers (a first layer, a second layer and a third layer), further wherein the second layer is sandwiched between the first and second layers such that the second layer of the support sheet is in direct contact on one side with the first layer of the support sheet and on the opposing side thereof with the third layer of the support sheet.

Aspect 12. A laminated glazing according to any of the aspects 7 to 11, wherein the support sheet is multi-layered having first, second and third layers, further wherein the first and third layers of the support sheet comprise glass or a polyester, such as PET, and the second layer of the support sheet comprises polyvinyl butyral or a copolymer of ethylene such as ethylene vinyl acetate.

Aspect 13. A laminated glazing according to any of the aspects 1 to 12, wherein the support sheet has a thickness between 50 µm and 1000 m.

Aspect 14. A laminated glazing according to any of the aspects 1 to 13, wherein the support sheet is thinner than the second sheet of glass and the second sheet of glass is thinner than the first sheet of glass.

Aspect 15. A laminated glazing according to any of the aspects 1 to 14, wherein the first layer of adhesive interlayer material is coextensive with the first sheet of glass.

Aspect 16. A laminated glazing according to any of the aspects 1 to 15, wherein the first layer of adhesive interlayer material is coextensive with the support sheet.

Aspect 17. A laminated glazing according to any of the aspects 1 to 16, wherein the first layer of adhesive interlayer material is coextensive with the support sheet and the first sheet of glass.

Aspect 18. A laminated glazing according to any of the aspects 1 to 17, wherein the first layer of adhesive interlayer material is coextensive with the second layer of interlayer material.

Aspect 19. A laminated glazing according to any of the aspects 1 to 18, wherein the second layer of adhesive interlayer material is coextensive with the second sheet of glass.

Aspect 20. A laminated glazing according to any of the aspects 1 to 19, wherein the second layer of adhesive interlayer material is coextensive with the support sheet.

Aspect 21. A laminated glazing according to any of the aspects 1 to 20, wherein the second layer of adhesive interlayer material is coextensive with second sheet of glass, the support sheet and the first layer of adhesive interlayer material.

Aspect 22. A laminated glazing according to any of the aspects 1 to 21, wherein the first sheet of glass is a sheet of thermally toughened glass or a sheet of thermally semi-toughened glass.

Aspect 23. A laminated glazing according to any of the aspects 1 to 22, wherein first sheet of glass has a thickness between 1.3 mm and 1.49 mm and a surface compressive stress in at least a central region of the first major surface of the first sheet of glass sheet in the range of 18 MPa to 23 MPa.

Aspect 24. A laminated glazing according to any of the aspects 1 to 22, wherein the first sheet of glass has a thickness between 1.5 mm and 1.69 mm and a surface compressive stress in at least a central region of the first major surface of the first sheet of glass in the range of 23.1 MPa to 26 MPa.

Aspect 25. A laminated glazing according to any of the aspects 1 to 22, wherein the first sheet of glass has a thickness between 1.7 mm and 1.99 mm and a surface compressive stress in at least a central region of the first major surface of the first sheet of glass in the range of 26.1 MPa to 30 MPa.

Aspect 26. A laminated glazing according to any of the aspects 1 to 22, wherein the first sheet of glass has a thickness between 2.0 mm and 2.19 mm and a surface compressive stress in at least a central region of the first major surface of the first sheet of glass in the range of 30.1 MPa to 35 MPa.

Aspect 27. A laminated glazing according to any of the aspects 1 to 22, wherein the first sheet of glass has a thickness between 2.2 mm and 2.49 mm and a surface compressive stress in at least a central region of the first major surface of the first sheet of glass in the range of 35.1 MPa to 45 MPa.

Aspect 28. A laminated glazing according to any of the aspects 1 to 22, wherein the first sheet of glass has a thickness between 2.5 mm and 2.7 mm and a surface compressive stress in at least a central region of the first major surface of the first sheet of glass in the range of 45.1 MPa to 65 MPa.

Aspect 29. A laminated glazing according to any of the aspects 1 to 22, wherein the first sheet of glass has a thickness between 2.71 mm and 6 mm and a surface compressive stress in at least a central region of the first major surface of the first sheet of glass in the range of 65.1 MPa to 150 MPa, more preferably in the range of 65.1 MPa to 100 MPa.

Aspect 30. A laminated glazing according to any of the aspects 1 to 29, wherein the thickness of the second sheet of glass is between 0.3 mm and 1.0 mm and/or wherein the thickness of the first sheet of glass is between 1 mm and 8 mm, preferably between 1.3 mm and 6 mm.

Aspect 31. A laminated glazing according to any of the aspects 1 to 30, wherein the second sheet of glass has been chemically strengthened.

Aspect 32. A laminated glazing according to any of the aspects 1 to 31, wherein the second sheet of glass has an alkali aluminosilicate glass composition.

Aspect 33. A laminated glazing according to any of the aspects 1 to 32, wherein the second sheet of glass includes at least about 6 wt % aluminium oxide.

Aspect 34. A laminated glazing according to any of the aspects 1 to 31, wherein the second sheet of glass has a composition comprising 66-72 mol. % $SiO_2$, 1-4 mol. % $Al_2O_3$, 8-15 mol. % MgO, 1-8 mol. % CaO, 12-16 mol. % $Na_2O$, preferably wherein MgO+CaO is between 12 and 17 mol. % and CaO/(MgO+CaO) is in the range 0.1 and 0.4 or wherein the second sheet of glass has a composition comprising (by weight) 58% to 70% $SiO_2$, 5% to 15% $Al_2O_3$, 12% to 18% $Na_2O$, 0.1% to 5% $K_2O$, 4% to 10% Mg and 0% to 1% CaO with the provisos that the sum of the $Al_2O_3$ and MgO exceeds 13%, that the sum of the amounts of $Al_2O_3$ plus MgO divided by the amount of $K_2O$ exceeds 3 and that the sum of the $Na_2O$ plus $K_2O$ plus MgO exceeds 22%.

Aspect 35. A laminated glazing according to any of the aspects 1 to 34, wherein the second sheet of glass is chemically strengthened to have surface compressive stress greater than 400 MPa, preferably between 400 MPa and 900 MPa, more preferably between 400 MPa and 700 MPa, even more preferably between 450 MPa and 675 MPa.

Aspect 36. A laminated glazing according to any of the aspects 1 to 35, wherein the second sheet of glass is chemically strengthened to have a depth of layer (DOL) between 10 μm and 60 μm, more preferably between 25 μm and 45 even more preferably between 30 μm and 40 μm.

Aspect 37. A laminated glazing according to any of the aspects 1 to 36, wherein the first and/or second layer of adhesive interlayer material comprises polyvinyl butyral (PVB), acoustic modified PVB, a copolymer of ethylene such as ethylene vinyl acetate (EVA), polyurethane (PU), polycarbonate, poly vinyl chloride (PVC) or a copolymer of ethylene and methacrylic acid.

Aspect 38. A laminated glazing according to any of the aspects 1 to 37, wherein the first and/or second layer of adhesive interlayer material has a thickness between 0.3 mm and 2.3 mm, preferably between 0.3 mm and 1.6 mm, more preferably between 0.3 mm and 0.9 mm.

Aspect 39. A laminated glazing according to any of the aspects 1 to 38, wherein the first and second layers of adhesive interlayer material, the first and second sheets of glass and the support sheet each have a respective first major surface and second opposing major surface, further wherein the laminated glazing is arranged such that: (i) the first major surface of the first layer of adhesive interlayer material faces the second major surface of the first sheet of glass; (ii) the second major surface of the first layer of adhesive interlayer material faces the first major surface of the support sheet; (iii) the second major surface of the support sheet faces the first major surface of the second layer of adhesive interlayer material; and (iv) the second major surface of the second layer of adhesive interlayer material faces the first major surface of the second sheet of glass and wherein the first layer of adhesive interlayer material is in direct contact with the second major surface of the first sheet of glass.

Aspect 40. A laminated glazing according to aspect 39, wherein the first layer of adhesive interlayer material is in direct contact with the first major surface of the support sheet.

Aspect 41. A laminated glazing according to aspect 39 or aspect 40, wherein the second layer of adhesive interlayer material is in direct contact with the first major surface of the second sheet of glass.

Aspect 42. A laminated glazing according to any of the aspects 39 to 41, wherein the second layer of adhesive interlayer material is in direct contact with the second major surface of the support sheet.

Aspect 43. A laminated glazing according to any of the aspects 39 to 42, wherein the first layer of adhesive interlayer material is in direct contact with the second major surface of the first sheet of glass and the first major surface of the support sheet.

Aspect 44. A laminated glazing according to any of the aspects 39 to 43, wherein the second layer of adhesive interlayer material is in direct contact with the second major surface of the support sheet and the first major surface of the second sheet of glass.

Aspect 45. A laminated glazing according to any of the aspects 39 to 44, wherein the first layer of adhesive interlayer material is in direct contact with the second major surface of the first sheet of glass and the first major surface of the support sheet and wherein the second layer of adhesive interlayer material is in direct contact with the second major surface of the support sheet and the first major surface of the second sheet of glass.

Aspect 46. A laminated glazing according to any of the aspects 1 to 45, wherein the first and second sheets of glass each have a periphery and the periphery of the second sheet of glass is contiguous with the periphery of the first sheet of glass or the periphery of the second sheet of glass is enclosed within the periphery of the first sheet of glass, preferably wherein a portion of the periphery of the first sheet of glass is aligned with a portion of the periphery of the second sheet of glass.

Aspect 47. A laminated glazing according to any of the aspects 1 to 46, wherein the first and/or second sheet of glass comprises a respective first connection portion for connecting the laminated glazing to a mechanism for moving the laminated glazing, preferably in a vertical direction.

Aspect 48. A laminated glazing according to aspect 47, wherein the first sheet of glass comprises a hole therein to define the first connection portion, further wherein the first layer of adhesive interlayer material has a hole therein and the hole in the first layer of interlayer material is concentric with the hole in the first sheet of glass.

Aspect 49. A laminated glazing according to aspect 48, wherein the hole in the first sheet of glass and the hole in the first layer of adhesive interlayer material are the same shape, preferably circular in shape.

Aspect 50. A laminated glazing according to aspect 48 or aspect 49, wherein the support sheet has a hole therein and the hole in the support sheet is concentric with the hole in the first layer of adhesive interlayer material.

Aspect 51. A laminated glazing according to aspect 50, wherein the hole in the support sheet and the hole in the first layer of adhesive interlayer material are the same shape, preferably circular in shape.

Aspect 52. A vehicle having an aperture for a window, in particular a side window, wherein (i) a laminated glazing according to any of the aspects 1 to 46 is fixed within the aperture or (ii) wherein a laminated glazing according to any of the aspects 1 to 46 is movable within the aperture or (iii) wherein a laminated glazing according to any of the aspects 47 to 51 is movable within the aperture by means of a mechanism connected to the first connection portion of the first or second sheet of glass.

Aspect 53. A vehicle according to aspect 52, wherein a laminated glazing according to any of the aspects 47 to 51 is vertically movable within the aperture by means of a mechanism connected to the first connection portion of the first or second sheet of glass.

Aspect 54. A vehicle according to aspect 52 or aspect 53, the vehicle having an interior and the aperture having a periphery, wherein the laminated glazing is movable to a first position to close the aperture such that from outside the vehicle, the interior of the vehicle is not accessible via the aperture, and when the laminated glazing is in the first position there is a portion of the laminated glazing not facing the aperture and a portion of the second major surface of the first sheet of glass is not directly facing the first major surface of the second sheet of glass.

The invention claimed is:

1. A laminated glazing comprising: a first sheet of glass joined to a second sheet of glass by an interlayer structure therebetween, the first and second sheets of glass each having a respective first major surface and a second opposing major surface; the interlayer structure comprising at least a first layer of adhesive interlayer material, a second layer of adhesive interlayer material and a support sheet, the support sheet being between the first and second layers of adhesive interlayer material;
   wherein the laminated glazing is arranged such that the first layer of adhesive interlayer material is between the first sheet of glass and the support sheet, the second layer of adhesive interlayer material is between the second sheet of glass and the support sheet support material and at least a portion of the second major surface of the first sheet of glass faces the first major surface of the second sheet of glass;
   wherein the first sheet of glass is thicker than the second sheet of glass, and the first and second sheets of glass each have a respective glass composition, the glass composition of the first sheet of glass being different than the glass composition of the second sheet of glass;
   wherein the first layer of adhesive interlayer material is coextensive with the support sheet;
   wherein the second layer of adhesive interlayer material is coextensive with second sheet of glass; and
   wherein the first and second sheets of glass each have a periphery and the periphery of the second sheet of glass is enclosed within the periphery of the first sheet of glass.

2. A laminated glazing according to claim 1, wherein the support sheet has a higher rigidity than the first and/or second layers of adhesive interlayer material and/or wherein the support sheet is more dimensionally stable than the first and/or second layers of adhesive interlayer material and/or wherein support sheet is stiffer than the first and/or second layers of adhesive interlayer material and/or wherein the support sheet has a Young's modulus between 0.1 GPa and 100 GPa.

3. A laminated glazing according to claim 1, wherein the support sheet comprises a polyester, or a sheet of glass or an ionoplast interlayer material.

4. A laminated glazing according to claim 1, wherein the support sheet is monolithic.

5. A laminated glazing according to claim 1, wherein the support sheet has a thickness between 50 µm and 1000 µm and/or wherein the support sheet is thinner than the second sheet of glass and the second sheet of glass is thinner than the first sheet of glass.

6. A laminated glazing according to claim 1, wherein the first layer of adhesive interlayer material is coextensive with the first sheet of glass.

7. A laminated glazing according to claim 1, wherein the second layer of adhesive interlayer material is coextensive with the support sheet.

8. A laminated glazing according to claim 1, wherein the first sheet of glass is a sheet of thermally toughened glass or a sheet of thermally semi-toughened glass.

9. A laminated glazing according to claim 1, wherein first sheet of glass has a thickness between 1.3 mm and 1.49 mm and a surface compressive stress in at least a central region of the first major surface of the first sheet of glass sheet in the range of 18 MPa to 23 MPa, or wherein the first sheet of glass has a thickness between 1.5 mm and 1.69 mm and a surface compressive stress in at least a central region of the first major surface of the first sheet of glass in the range of 23.1 MPa to 26 MPa, or wherein the first sheet of glass has a thickness between 1.7 mm and 1.99 mm and a surface compressive stress in at least a central region of the first major surface of the first sheet of glass in the range of 26.1 MPa to 30 MPa, or wherein the first sheet of glass has a thickness between 2.0 mm and 2.19 mm and a surface compressive stress in at least a central region of the first major surface of the first sheet of glass in the range of 30.1 MPa to 35 MPa, or wherein the first sheet of glass has a thickness between 2.2 mm and 2.49 mm and a surface compressive stress in at least a central region of the first major surface of the first sheet of glass in the range of 35.1 MPa to 45 MPa, or wherein the first sheet of glass has a thickness between 2.5 mm and 2.7 mm and a surface compressive stress in at least a central region of the first major surface of the first sheet of glass in the range of 45.1 MPa to 65 MPa, or wherein the first sheet of glass has a thickness between 2.71 mm and 6 mm and a surface compressive stress in at least a central region of the first major surface of the first sheet of glass in the range of 65.1 MPa to 150 MPa.

10. A laminated glazing according to claim 1, wherein the thickness of the second sheet of glass is between 0.3 mm and 1.0 mm and/or wherein the second sheet of glass has been chemically strengthened.

11. A laminated glazing according to claim 1, wherein the second sheet of glass is chemically strengthened to have surface compressive stress greater than 400 MPa and/or wherein the second sheet of glass is chemically strengthened to have a depth of layer (DOL) between 10 µm and 60 µm.

12. A laminated glazing according to claim 1, wherein the first and/or second layer of adhesive interlayer material comprises polyvinyl butyral (PVB), acoustic modified PVB, a copolymer of ethylene, ethylene vinyl acetate (EVA), polyurethane (PU), polycarbonate, poly vinyl chloride (PVC) or a copolymer of ethylene and methacrylic acid, and/or wherein the first and/or second layer of adhesive interlayer material has a thickness between 0.3 mm and 2.3 mm.

13. A laminated glazing according to claim 1 having a solar control function.

14. A laminated glazing according to claim 13, wherein the solar control function is provided by a solar control coating on the first and/or second sheet of glass and/or wherein the solar control function is provided by the first and/or second sheet of glass, or
wherein the solar control function is provided by an infrared ray reflecting coating on the support sheet; or
wherein the solar control function is provided by the first and/or second layer of adhesive interlayer material.

15. A laminated glazing according to claim 1, wherein a portion of the periphery of the first sheet of glass is aligned with a portion of the periphery of the second sheet of glass.

16. A vehicle having an aperture, wherein a laminated glazing according to claim 1 is (i) fixed within the aperture or (ii) movable within the aperture or (iii) movable within the aperture by a mechanism connected to the first connection portion of the first or second sheet of glass.

17. A laminated glazing according to claim 1, wherein the first layer of adhesive interlayer material and the support sheet are coextensive with the first sheet of glass.

18. A laminated glazing comprising: a first sheet of glass joined to a second sheet of glass by an interlayer structure therebetween, the first and second sheets of glass each having a respective first major surface and a second opposing major surface; the interlayer structure comprising at least a first layer of adhesive interlayer material, a second layer of adhesive interlayer material and a support sheet, the support sheet being between the first and second layers of adhesive interlayer material;
wherein the laminated glazing is arranged such that the first layer of adhesive interlayer material is between the first sheet of glass and the support sheet, the second layer of adhesive interlayer material is between the second sheet of glass and the support sheet support material and at least a portion of the second major surface of the first sheet of glass faces the first major surface of the second sheet of glass;
wherein the first sheet of glass is thicker than the second sheet of glass, and the first and second sheets of glass each have a respective glass composition, the glass composition of the first sheet of glass being different than the glass composition of the second sheet of glass;
wherein the first layer of adhesive interlayer material is coextensive with the support sheet or the first sheet of glass;
wherein the second layer of adhesive interlayer material is coextensive with second sheet of glass; and
wherein the second layer of adhesive interlayer material is not coextensive with the support sheet.

19. A laminated glazing according to claim 18, wherein the first layer of adhesive interlayer material is coextensive with the first sheet of glass and the support sheet.

20. A laminated glazing comprising: a first sheet of glass joined to a second sheet of glass by an interlayer structure therebetween, the first and second sheets of glass each having a respective first major surface and a second opposing major surface; the interlayer structure comprising at least a first layer of adhesive interlayer material, a second layer of adhesive interlayer material and a support sheet, the support sheet being between the first and second layers of adhesive interlayer material;
wherein the laminated glazing is arranged such that the first layer of adhesive interlayer material is between the first sheet of glass and the support sheet, the second layer of adhesive interlayer material is between the second sheet of glass and the support sheet support material and at least a portion of the second major surface of the first sheet of glass faces the first major surface of the second sheet of glass;

wherein the first sheet of glass is thicker than the second sheet of glass, and the first and second sheets of glass each have a respective glass composition, the glass composition of the first sheet of glass being different than the glass composition of the second sheet of glass;

wherein at least one of the first sheet of adhesive interlayer material and the support sheet is not coextensive with the first sheet of glass;

wherein the second layer of adhesive interlayer material is coextensive with the second sheet of glass; and wherein the second layer of adhesive interlayer material is not coextensive with the support sheet.

* * * * *